(12) United States Patent
Mayhew

(10) Patent No.: US 7,267,353 B1
(45) Date of Patent: Sep. 11, 2007

(54) MOTORCYCLE KICKSTAND SUPPORT

(76) Inventor: Dennis E. Mayhew, 1960 NS. East Boutell, Essexville, MI (US) 48732

( * ) Notice: Subject to any disclaimer, the term of this patent is extended or adjusted under 35 U.S.C. 154(b) by 259 days.

(21) Appl. No.: 11/024,580

(22) Filed: Dec. 29, 2004

(51) Int. Cl.
*B62H 7/00* (2006.01)
*A47B 91/12* (2006.01)

(52) U.S. Cl. ............ 280/293; 280/284.4; 280/291; 248/188.9; 248/346

(58) Field of Classification Search ............ 280/293, 280/284.4, 291; 248/188.9, 346
See application file for complete search history.

(56) References Cited

U.S. PATENT DOCUMENTS

| | | | |
|---|---|---|---|
| 4,521,031 A * | 6/1985 | Huth | 280/293 |
| 4,625,987 A * | 12/1986 | Marsh | 280/293 |
| 4,655,472 A | 4/1987 | Pletscher | |
| D294,014 S | 2/1988 | McMurtrey | |
| 4,971,347 A | 11/1990 | Cline | |
| 5,388,848 A | 2/1995 | Silva et al. | |
| D396,435 S * | 7/1998 | Favereaux, Sr. | D12/120 |
| 6,196,567 B1 | 3/2001 | Lynam et al. | |
| D493,655 S | 8/2004 | DeFelice | |
| D493,656 S | 8/2004 | DeFelice | |

* cited by examiner

*Primary Examiner*—Lesley D. Morris
*Assistant Examiner*—Marlon Arce-Diaz
(74) *Attorney, Agent, or Firm*—John K. McCulloch

(57) ABSTRACT

A support for use with a two wheeled vehicle, such as a motorcycle, having a kickstand arm adapted to support the vehicle in a parked condition with the kickstand arm at ground level. The support has a much larger area than that of the free end of the kickstand, thereby avoiding embedding of the free end of the kickstand in the ground or pavement on which the motorcycle is parked. An adjustable length lanyard couples the support member to a selected part of the motorcycle, thereby facilitating retrieval of the support when its use no longer is necessary.

10 Claims, 1 Drawing Sheet

MOTORCYCLE KICKSTAND SUPPORT

This invention relates to a support for a motorcycle kickstand and more particularly to a support adapted to be accommodated between the free end of a motorcycle kickstand and ground.

BACKGROUND OF THE INVENTION

A motorcycle or other two-wheel vehicle conventionally is equipped with a kickstand located at one lower side of the vehicle so as to be movable by the rider's foot from a raised or retracted position to a lowered, extended position in which it supports the motorcycle. The kickstand has a supporting arm which, in the extended position, projects downwardly and laterally and is of such length that, when the free end engages the ground or paved surface at ground level, the motorcycle may assume a generally upright condition which will be maintained by the kickstand, thereby enabling the rider to park and leave the motorcycle. Conventionally, the kickstand arm is of such length that, when the vehicle is in its parked condition, the motorcycle is not vertical, but is inclined or tilted toward that side of the vehicle on which the kickstand is mounted. This minimizes the possibility that the motorcycle will fall toward the opposite side.

In those instances in which the free end of the extended kickstand arm engages unpaved ground or pavement, such as asphalt, particularly on a hot day, the free end of the kickstand arm may become embedded with the result that the center of gravity of the vehicle moves so far toward the side on which the kickstand is mounted that the motorcycle falls. Even if the motorcycle does not fall, the embedding of the kickstand arm is objectionable for a number of reasons.

Some motorcycles are so heavy that, should they fall, the rider may be unable to restore the motorcycle to an upright condition without assistance. In some instances, assistance is not readily available so the rider of a fallen motorcycle may be unable to return the motorcycle to a usable position for an extended period of time.

Regardless of whether a rider may return a fallen motorcycle to a usable position, either with or without assistance, the falling of a motorcycle is undesirable because one of more parts of the vehicle may be damaged.

The disadvantages of the consequences of embedding the free end of a kickstand arm in soft ground or pavement have been recognized heretofore. One proposal to minimize embedding the kickstand arm is to provide a portable support which may be placed on the ground or pavement in a position between the ground and the free end of the kickstand arm. The support is formed of a material of such strength and area as to provide a rigid support for the kickstand arm. In use, the portable support is placed on the ground in such position that the free end of the kickstand may contact the support, thereby enabling the rider to park the vehicle even though the ground or pavement at the parking site is soft.

When such a portable support is used and the rider returns to the parked vehicle, it is customary for the rider to move the vehicle from its tilted, parked condition to a more upright position thereby enabling the portable support to be retrieved. When this occurs, however, the rider is in an awkward position during the retrieval of the support as a result of which here is a possibility that the rider will be unable to prevent falling of the motorcycle. This possibility is enhanced in those instances in which the rider may be astride the motorcycle and must lean over to such an extent as to grasp the portable support.

A principal objective of the invention is to provide a portable support which overcomes or greatly minimizes the disadvantages referred to above.

SUMMARY OF THE INVENTION

A portable support for the free end of a motorcycle kickstand arm and constructed in accordance with the invention comprises a base to which is coupled one end of an elongate lanyard, the opposite end of which is provided with means for separably connecting it to a selected part of the motorcycle frame. Preferably, the support is formed of a rigid material of such strength as to provide stable support for the motorcycle and which is of such area as to provide a secure supporting surface for the free end of the motorcycle kickstand and prevent such free end from becoming embedded in the surface on which the motorcycle is to be parked. The lanyard may be formed of an elastic material which enables the lanyard to span the distance from the portable support to some part of the motorcycle frame, such as a handlebar, which is readily accessible to the rider without the necessity of the rider's bending over in initially placing or retrieving the support.

Alternatively, the lanyard may be coiled about a spool located within a housing in such manner as to enable the lanyard to be unwound from and rewound on the spool. The spool itself may have attached thereto a loop which may be applied to the handlebar or some other part of the motorcycle frame. In any event, the lanyard enables the rider to place the kickstand support in proper position before parking the motorcycle and enables the rider to retrieve the portable support prior to riding the motorcycle and without the rider's having to assume an awkward retrieving position in which it is difficult to prevent tipping over of the motorcycle.

THE DRAWINGS

Support apparatus constructed in accordance with the preferred embodiment of the invention is illustrated in the accompanying drawings wherein.

THE PREFERRED EMBODIMENT

Figure 1:
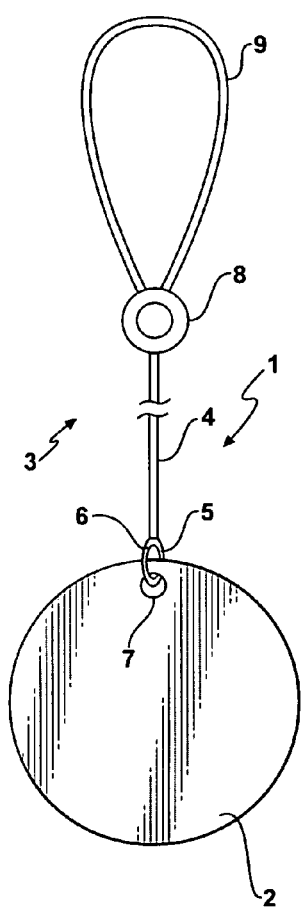
FIG. 1 is a fragmentary, elevational view of the apparatus.
Figure 2:
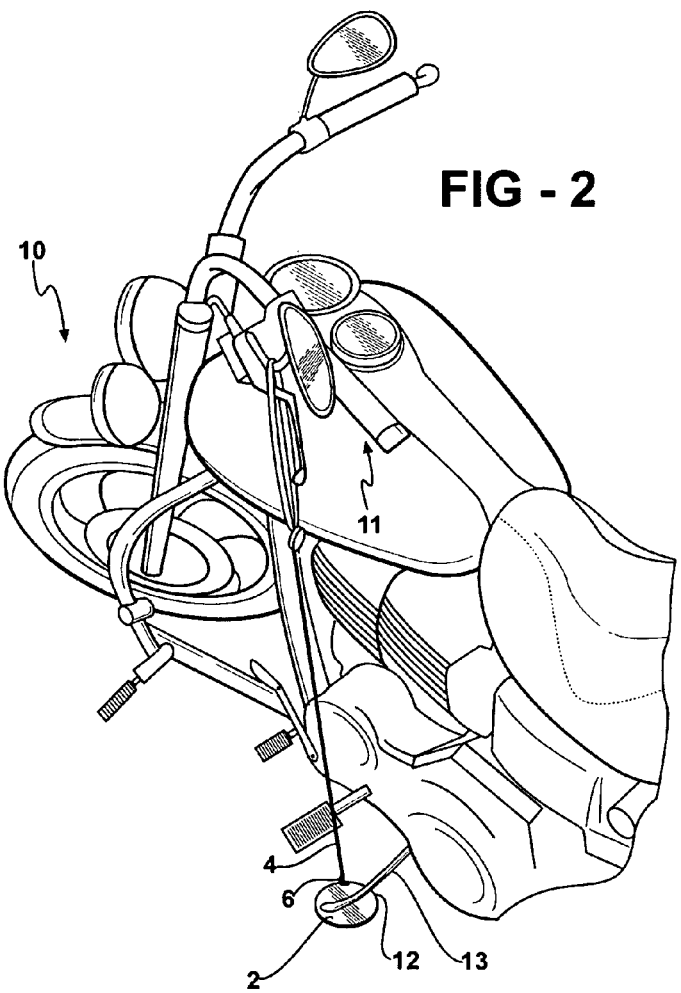
FIG. 2 is a fragmentary, isometric view of a portion of a typical motorcycle supported in a parked condition by the support apparatus.
Figure 3:
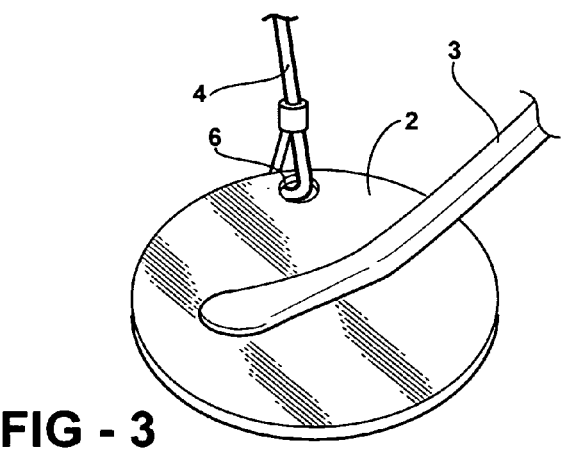
FIG. 3 is an enlarged, isometric view of a portion of the apparatus shown in FIG. 2.

Support apparatus formed according to the preferred embodiment is designated generally by the reference character 1 and comprises a support or base member 2 formed of suitable metal or rigid plastic material, such as ABS, or any other suitable, rigid material. As shown, the base 2 is a circular disc obtainable from any one of a number of sources, one of which is Crown Advertising, Inc., of Rantoul, Ill.

The apparatus also includes a lanyard 3 having an elongate cord 4 secured at one end to the support plate 2 by a ring 5 which passes through a loop 6 at the lower end of the cord and through an opening 7 in the plate 2. The opposite end of the cord enters a housing 8 and is wound around a spool (not shown) rotatably mounted in the housing in known manner.

The spool is spring biased to rotate in a direction to wind the cord about the spool so as normally to maintain the cord in a retracted condition within the housing. The housing 8, including the assembled cord, spool, and spring, is obtainable from any one of a number of known sources.

Fixed to the housing 8 is a flexible coupling loop 9 which may be formed of coiled plastic or fabric material and which constitutes means for removably coupling the lanyard to some part of the vehicle frame, handlebar, or attachment. As shown, the vehicle 10 is a motorcycle having a pair of handlebars, one of which is shown at 11. The loop 9 encircles the handlebar.

When not in use the support apparatus normally has the cord 4 in a retracted condition within the housing 8 and is carried by the rider in a pocket, saddlebag, or other storage place. To condition the apparatus for use, the rider drives the motorcycle to a parking area, places the support base 2 on the ground or pavement in a position to be interposed between the ground and the free end 12 of a kickstand arm 13, the opposite end of which is pivoted to a bracket (not shown) which, in turn, is secured to the motorcycle frame adjacent and at one side of the lower end of the latter. The rider then may pivot the kickstand arm to a position in which its free end is directly above the base 2, following which the rider may tip the motorcycle an amount sufficient to enable the free end of the kickstand arm to bear upon the support 2. The lanyard then may be extended by the rider's pulling upwardly on the coupling loop 9 and the latter may be coupled to the adjacent handlebar 11 or to any other accessible part of the motorcycle.

During the placement of the support 2 on the ground or pavement and the coupling of the lanyard to the handlebar, the rider may remain astride the motorcycle without having to bend over any appreciable amount. As a consequence, the rider at all times remains in a position to maintain control over the position of the vehicle, thereby greatly minimizing any risk that the motorcycle may tip over.

When the rider wishes to use the motorcycle he or she may assume a position astride the vehicle, uncouple the loop 9 from its attachment to the handlebar, rock the motorcycle to a position to elevate the free end of the kickstand arm above the support member 2, thereby enabling the cord 4 to be retracted into the housing 8 and the assembly returned to its storage position.

During the uncoupling of the support apparatus from the vehicle the rider at all times may remain astride the motorcycle, thereby minimizing any risk that the latter will tip over.

The cord 4 need not be elastic as long as it is capable of being extended from and retracted into the housing 8. If the housing is not used, it is desirable that the cord 4 be elastic, thereby making it possible to maintain the cord taut when the coupling loop 9 is attached to the handlebar 11 or other part of the motorcycle, so as to minimize the possibility that the cord will become slack and prone to separating from its attachment to the motorcycle.

As used herein the term ground or ground level means the upper surface of earth, sand, or pavement on which the vehicle is to be parked. In all instances the area of the support member 2 is greater that than of the free end of the kickstand arm and sufficiently great that it will not become embedded in the ground.

The disclosed embodiment is representative of a presently preferred form of the invention, but is intended to be illustrative rather than definitive thereof. The invention is defined in the claims.

I claim:

1. A support for use with a two-wheeled vehicle having an handlebar at a level above ground level and a kickstand having an arm coupled at one end to said vehicle and being free at its opposite end, said support comprising a ground engageable base member having a surface area greater than that of said free end of said kickstand and adapted to removably occupy a vehicle supporting position between ground level and said free end of said kickstand; a lanyard having a first end and a second end; means securing said first end of said lanyard to said base member; and coupling means coupled to said second end of said lanyard, said coupling means including an attachment enabling said lanyard separably to be coupled to said handlebar and extend therefrom to said base member when the latter is in said supporting position.

2. The support according to claim 1 wherein said lanyard is elastic.

3. The support according to claim 1 wherein said attachment forms a closed loop.

4. The attachment according to claim 3 wherein said coupling means comprises a housing into and from which said lanyard may be retracted and extended.

5. The attachment according to claim 1 wherein said lanyard is connected to said base member by a ring.

6. A support for a motorcycle having a handlebar and a kickstand having an arm one end of which is free and the opposite end of which is coupled to said motorcycle, said support comprising a ground engageable base having an area greater than that of said one end of said arm, said base being adapted to occupy a supporting position between ground level and said one end of said arm for engagement by said one end of said arm and thereby provide partial support for said motorcycle; an elongate lanyard having first and second ends; means connecting said first end of said lanyard to said base; and coupling means for removably connecting said second end of said lanyard to said handlebar, said lanyard and said coupling means being of such length as to extend the distance from said handlebar to said base while said base occupies said position.

7. The support according to claim 5 wherein at least part of said lanyard is removably coiled within a housing.

8. The support according to claim 5 wherein said coupling means comprises a loop.

9. The support according to claim 5 wherein said lanyard is inelastic.

10. The support according to claim 5 wherein said lanyard is formed at least in part by elastic material.

* * * * *

UNITED STATES PATENT AND TRADEMARK OFFICE
CERTIFICATE OF CORRECTION

| | | |
|---|---|---|
| PATENT NO. | : 7,267,353 B1 | Page 1 of 1 |
| APPLICATION NO. | : 11/024580 | |
| DATED | : September 11, 2007 | |
| INVENTOR(S) | : Dennis E. Mayhew | |

It is certified that error appears in the above-identified patent and that said Letters Patent is hereby corrected as shown below:

Column 4, in line 1 of each of claims 7, 8, 9, and 10, change "5" to -- 6 --.

Signed and Sealed this

Twentieth Day of November, 2007

JON W. DUDAS
*Director of the United States Patent and Trademark Office*